United States Patent [19]

Kimmelman

[11] 4,096,470

[45] Jun. 20, 1978

[54] ALTERNATING LAMP FLASHING SYSTEM WITH LAMP FAILURE INDICATOR

[75] Inventor: Samuel Kimmelman, Cranford, N.J.

[73] Assignee: Ideal Corporation, Brooklyn, N.Y.

[21] Appl. No.: 789,494

[22] Filed: Apr. 21, 1977

[51] Int. Cl.$^2$ .......................... B60Q 1/38; B60Q 1/46

[52] U.S. Cl. ...................................... 340/83; 340/251; 315/217

[58] Field of Search ................. 340/251, 80, 81 F, 83, 340/85; 315/200 A, 217, 322

[56] References Cited

U.S. PATENT DOCUMENTS

| | | | |
|---|---|---|---|
| 3,469,232 | 9/1969 | Prickett | 340/80 |
| 3,493,927 | 2/1970 | Effenberger | 340/83 |
| 3,508,237 | 4/1970 | Kimmelman | 340/251 |
| 3,576,444 | 4/1971 | Roberts | 340/81 F |
| 3,668,678 | 6/1972 | Porter | 340/251 |
| 3,925,757 | 12/1975 | Kimmelman | 340/251 |
| 3,956,733 | 5/1976 | Sakurai | 340/251 |
| 3,965,456 | 6/1976 | Schwellenbach | 340/251 |

*Primary Examiner*—Donald J. Yusko

*Attorney, Agent, or Firm*—Albert C. Johnston; Gerard F. Dunne

[57] ABSTRACT

A system for alternately flashing two groups of signal lamps, as commonly employed for emergency and police vehicles, school buses, or the like, is provided with a lamp failure indicating circuit comprising two separate relay coils connected, respectively, as parts of current load lines to the lamp groups so that each coil normally will act through a contactor to energize a pilot circuit, thus causing a pilot lamp to be lighted so frequently when all the signal lamps are functional that the pilot lamp appears to be steadily illuminated; yet a relay coil will not so act, and the pilot lamp then will flash intermittantly to indicate a lamp outage, when a signal lamp on the load line of either coil does not function. In one embodiment, each relay coil has a contactor of its own in a separate branch of the pilot lamp circuit; in another, the two relay coils act alternately to displace a common contactor in the pilot lamp circuit.

4 Claims, 3 Drawing Figures

ALTERNATING LAMP FLASHING SYSTEM WITH LAMP FAILURE INDICATOR

The present invention relates to an indicator or pilot circuit for informing the driver of a vehicle equipped with a system for alternately flashing separate groups of signal lamps of a condition which exists when all the signal lamps are functioning properly, and for calling attention to a failure, or outage, of any of the signal lamps.

Motor vehicles used for special public services, such as emergency and police vehicles, school buses and the like, often are provided with signal lamps arranged in two groups which are flashed alternately in order to give warning of the approach or presence of the service vehicle, thus reducing risks of accident or collision. It is important that all the signal lamps of the vehicle be kept functioning properly and that its operator be made aware immediately of any lamp failure, or outage, in either of the groups of lamps.

The object of the present invention is to provide an alternating lamp flashing system with a lamp failure indicating circuit which will activate a signalling device such as a pilot lamp in a certain manner when all the lamps of the system are functional, and in a different manner noticeable to a vehicle operator if a lamp of either of the alternately flashing lamp groups does not function.

The invention is suited for a vehicle lamp system of the type above mentioned, which typically includes two groups of signal lamps, a source of direct current and means including an alternating flasher switch and respective current load lines from the flasher switch to the lamp groups for repetitively flashing the lamp groups alternately by current from the d.c. source. According to the present invention, two separate relay coils are provided for connection respectively as conducting parts of the current load lines; each of the relay coils has associated with it a contactor which it will displace in response only to a flow of current through the coil at least as great as that which exists when every lamp of the lamp group to be energized through the coil is functioning; and each contactor forms part of a pilot circuit by which a pilot lamp will be energized upon each current responsive displacement of the contactor. As a result, the pilot lamp is flashed so frequently that it appears to be illuminated steadily when all the signal lamps of the alternately flashed lamp groups are functional; yet it will be illuminated intermittently so as to give a noticeable indication of lamp outage when any signal lamp of either lamp group does not function.

In one embodiment of the invention, each of the relay coils has a contactor of its own and the pilot circuit comprises two branches for energizing the pilot lamp, each of which contains one of the contactors and also contains a circuit element, typically a diode, for limiting current flow in the branch to flow in the direction toward the pilot lamp. These circuit branches may be connected respectively to the current load lines to receive energizing current from them for the pilot lamp.

In another embodiment of the invention, the relay coils have a single contactor in common, which forms part of the pilot circuit and is associated with and displaceable as mentioned above by each of the relay coils. The pilot circuit containing this contactor may lead from a terminal for connecting it with the d.c. current source in parallel with the flasher switch. Alternatively, according to a further embodiment, a pilot circuit containing the single contactor comprises two energizing branches each of which leads through the contactor to the pilot lamp and is connected to receive energizing current from one only of the load lines and contains a circuit element, typically a diode, for limiting current flow in the branch to flow in the direction toward the pilot lamp.

The foregoing and other objects, features and advantages of the present invention will be further apparent from the following detailed description and the accompanying drawings of illustrative embodiments of the invention. In the drawings.

Figure 1:
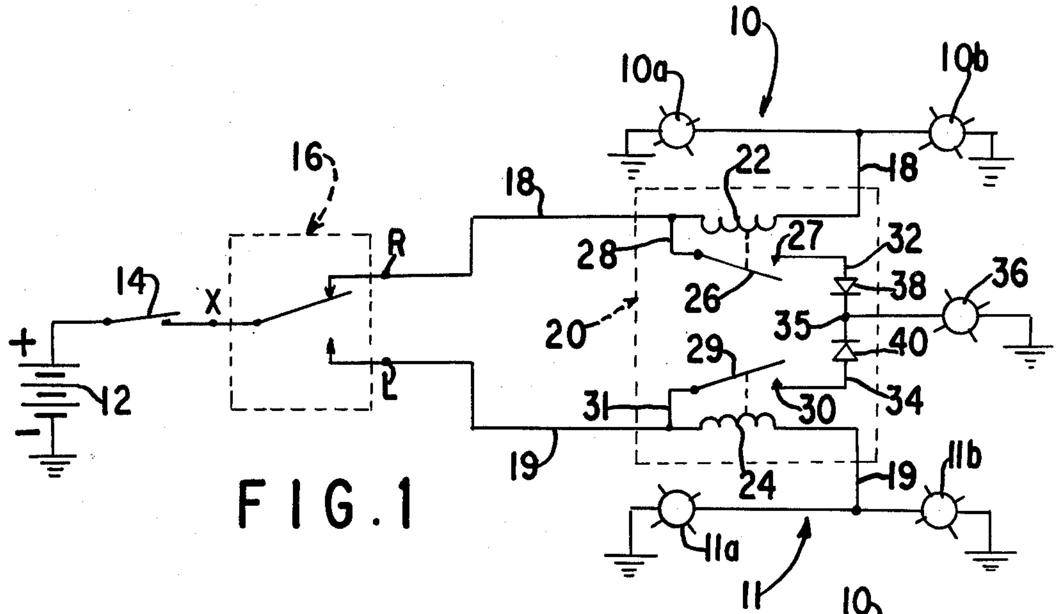
FIG. 1 is a schematic curcuit diagram showing an embodiment of the invention in a system for alternately flashing two groups of signal lamps.

The circuits shown schematically in the drawings are alike in that each of them is designed for alternately flashing two groups 10 and 11 of vehicle signal lamps by intermittently supplying to each lamp group energizing current from a direct current source 12. The d.c. source can be connected to the respective signal lamps of the two groups via an alternating flasher switch 16 and separate load lines 18 and 19 from this switch. The lamp group 10 typically includes one or more front signal lamps 10*a* and one or more rear signal lamps 10*b*, at the right-hand side of the vehicle; and lamp group 11 typically includes corresponding signal lamps 11*a* and 11*b* at the left hand side of the vehicle. The d.c. source 12 typically is a storage battery of the vehicle, which is connectable with an input terminal X of the lamp flashing system by a system-activating switch 14. The signal lamps and the battery have ground connections as indicated in the drawings, which typically are made through the frame of the vehicle.

The alternating flasher switch 16 is a component well known for use in alternately flashing lamp systems. For instance, it may be a product available commercially as the Model 537 variable load flasher of Ideal Corporation, Brooklyn, N.Y. The flasher has two alternately energized output, or load, terminals R and L which lead respectively via the current load lines 18 and 19 to the two lamp groups 10 and 11. In well known manner, upon a closing of the system activating switch 14 the flasher switch 16 operates to connect the load lines alternately with the current input terminal X at a rate providing, for instance, about 90 flashings of each lamp group per minute, so about 180 flashings in all per minute, with intervals for the switch movement of, for instance, about 30 to 50 microseconds between successive flashings.

According to the embodiment of the invention illustrated in FIG. 1, a circuit 20 for indicating functional conditions of the signal lamps has an output terminal 35 for connection with a pilot lamp 36 and comprises two separate relays the respective coils 22 and 24 of which form conducting parts of the load lines 18 and 19, respectively, through which, when the lamp flashing circuit is active, current flows from the flasher 16 alternately to the two groups of signal lamps.

The two relays have normally open contactors 26 and 29, respectively, which form parts of respective branches 32 and 34 of a pilot circuit for conducting energizing current to the pilot lamp 36 via terminal 35. Each relay coil is so designed that it will produce a magnetic field strong enough to close the related contactor 26 or 29 when the level of current flow through the coil corresponds to that which exists when all the signal lamps on the related load line 18 or 19 are functioning, yet so that the magnetic field strength will be insufficient to close the related contactor if the current flow through the coil occurs at a lower level such as that which exists when any signal lamp of the related lamp group 10 or 11 does not function.

In the embodiment illustrated in FIG. 1, current for energizing the pilot lamp when either of the contactors 26 and 29 is closed is obtained from the respective load lines 18 or 19 through a lead 28 or 31, respectively, which extends from the load line to the contactor. Each of the pilot circuit branches 32 and 34 contains not only a contactor 26 or 29 to be displaced to circuit closing position by the related relay coil but also suitable means for limiting current flow in the branch to flow in the direction toward the pilot lamp. For this purpose, diodes 38 and 40 may be connected in the branches 32 and 34, respectively, as shown in FIG. 1, so that current in one of these branches will be blocked against flowing into the other of them even if the contactor in the other should happen still to be in conducting relation to its fixed contact 27 or 30 when the one branch is energized.

The lamp flashing system of FIG. 1 operates as follows: When the activating switch 14 is closed the alternating flasher switch 16 continually alternates its connection with the d.c. current source to and from the load line 18 and the load line 19, thus causing the signal lamps of groups 10 and 11 to be flashed alternately. If all the lamps of the two lamp groups are functioning normally, each energization of each lamp group is attended by current flow through the related relay coil 22 or 24 at a level which causes the related contactor 26 or 29 to close and energize its branch 32 or 34 of the pilot circuit, thus causing the pilot lamp 36 to be illuminated.

Under this normal operating condition, the pilot lamp is energized upon each flashing of the signal lamps of either lamp group and, although the current flow to the pilot lamp is momentarily interrupted with each switching from one load line to the other, the time intervals of the interruptions are so short that the pilot lamp appears to be steadily illuminated. This normal, steady-on appearance of the pilot lamp results from an interval of decay of its incandescence and an interval of persistence of its light as perceived by the human eye. The same steady-on appearance can be obtained when the intervals of current interruption in the flasher switch last up to as long as about 0.030 second.

If, however, a signal lamp of either of the lamp groups should fail to function when the lamp flashing system is active, for instance because of a signal lamp being burned out or not properly installed, the current flow through the relay coil 22 or 24 to the lamp group containing the inactive lamp occurs at a reduced level insufficient to cause closing of the related contactor of the pilot circuit. Consequently, the pilot lamp will not be lighted when the lamp group containing the inactive signal lamp is energized, and, all signal lamps of the other lamp group being functional, the pilot lamp will be illuminated only when the signal lamps of the other lamp group are being flashed. Accordingly, the pilot lamp 36 will now be illuminated periodically with interruptions of, for instance, about half a second between successive illuminations. This produces a flashing of the pilot lamp which is noticeable by the vehicle operator and indicates that a signal lamp of the system is not functional.

It will be apparent, further, that in the unlikely event of a lamp being non-functional in each of the two groups of signal lamps, neither of the relay coils will cause its contactor to activate the pilot circuit; so, in such event, the pilot lamp will not be lighted at all and the vehicle operator will thus be informed of the plural lamp outages.

Figure 2:
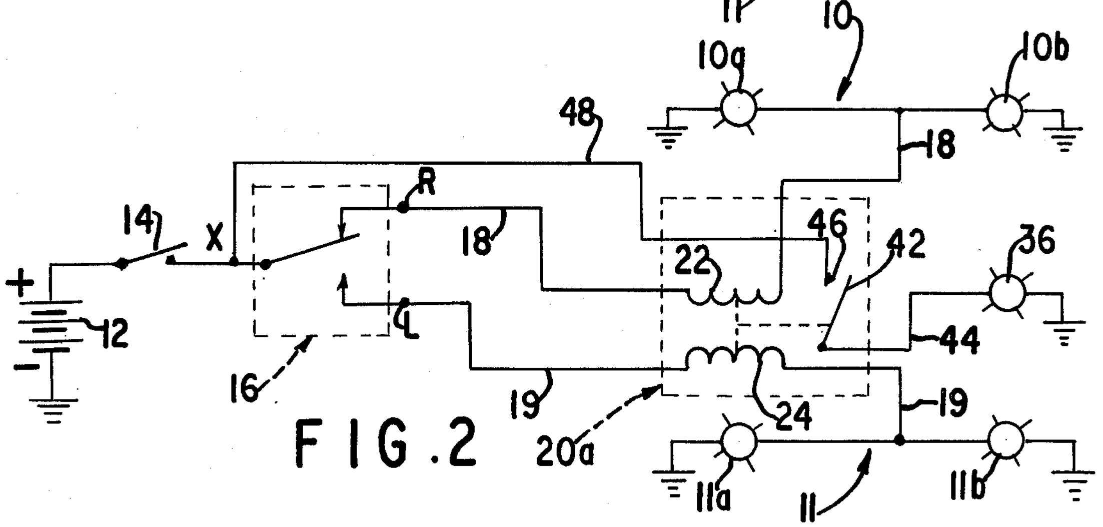
FIG. 2 and FIG. 3 are similar diagrams of modified embodiments of the invention.

FIG. 2 illustrates an embodiment of the invention generally similar to the FIG. 1 embodiment but different from it principally in that the respective relay coils 22 and 24 in the load lines to the lamp groups 10 and 11 are coils of a relay having a single, normally open contactor 42 in common for activating an energizing circuit to the pilot lamp 36. The current supply for the pilot lamp in this embodiment is conducted to the fixed contact 46 of the relay by a line 48 leading from the input terminal X of the alternating flasher switch 16. Line 46 thus is connected in parallel with the flasher switch 16 so that while the system activating switch 14 is closed any closing of the contactor 42 will energize the pilot lamp.

The embodiment of FIG. 2 operates in generally the same manner as the embodiment of FIG. 1. Upon closing of the system switch 14 the alternating flasher 16 begins switching the current supply at input terminal X to terminals R and L alternately, at a predetermined rate. When the load circuit is closed via terminal R and line 18, with both of the lamps **10*a* and 10*b* functional, the current flow through the relay coil 22 will cause the contactor 42 to close, thus lighting the pilot lamp. When the flasher switch transfers the load current connection to the lamps 11*a* and 11*b* via terminal L and line 19, the current flow through coil 22 ceases, so that the contactor 42 may open momentarily; but the current flow then immediately instituted through coil 24, assuming that both of the lamps 11*a* and 11*b* are functional, causes the contactor 42 to be returned to closed position so quickly that the pilot lamp appears to be lighted steadily. The same condition occurs when the flasher switch transfers the load current back to line 18**.

On the other hand, if a signal lamp in either of the lamp groups 10 and 11 does not function, the current drawn by the remaining lamp or lamps of the same lamp group is insufficient to activate the relay, so that, while that lamp group is being flashed, the contactor 42 opens to inactivate the pilot circuit and causes the pilot lamp to go off until the other, fully functional lamp group is energized. Thus, in the event of a signal lamp outage in either lamp group, the pilot lamp will flash intermittently as the other lamp group is energized, indicating that one of the lamp groups is not completely functional.

Figure 3:
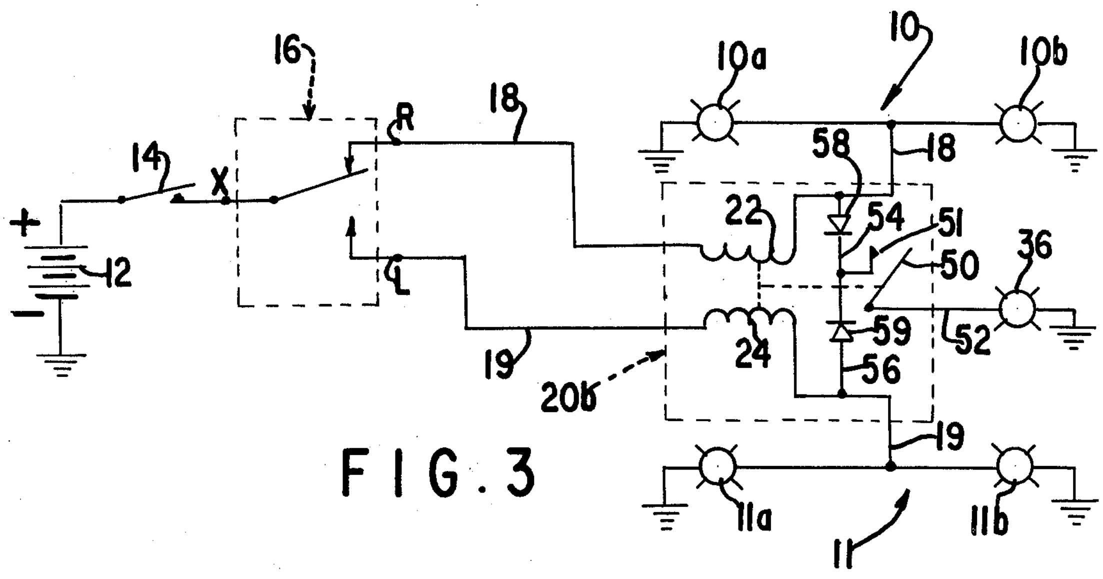

The embodiment of the invention illustrated in FIG. 3 makes use of a two-coil relay like that of FIG. 2, having a single, normally open contactor 50 for closing a pilot circuit through which the pilot lamp 36 may be energized from the load line 18 or 19 when either of these load lines is energized by the alternating flasher switch 16. The pilot circuit in this embodiment comprises branches 54 and 56 which are connected with the load lines 18 and 19, respectively, via diodes 58 and 59, respectively, so that current can flow in either branch only in the direction toward the pilot lamp 36, and only when the contactor 50 is closed by one of the coils 22 and 24 so as to make contact at 51 for energizing lead 52 to the pilot lamp.

The circuit of FIG. 3 thus is like that of FIG. 1 in that no special connection with the flasher input terminal X is required for energizing the pilot circuit. The circuit operates in substantially the same manner as the circuit of FIG. 2. When the flashing system is activated and all the signal lamps are functional, the contactor 50 is closed so frequently that the pilot lamp appears to be illuminated steadily. When a signal lamp of either of the alternately flashing lamp groups does not function, the pilot lamp illumination is interrupted during each energization of the defective lamp group, thus causing a flashing of the pilot lamp which indicates that a lamp outage exists in the signal lamp circuit.

While in the illustrated embodiments of the invention each group of signal lamps is composed of two lamps, it is to be understood that any desired number of signal lamps may be provided in each group. In any case, the relay in the load line of the lamp group is to be suitably calibrated so that the contactor to be operated by the relay coil will not be moved to close the pilot lamp circuit unless the load current through the coil is at least as great as that which exists when all signal lamps of the group are functioning.

What is claimed is:

1. For a vehicle lamp circuit including two groups of signal lamps each of which comprises at least one lamp, a d.c. source, means including an alternating flasher switch and respective current load lines from said flasher switch to said lamp groups for repetitively flashing said lamp groups alternately by current from said source, and a pilot lamp for indicating circuit conditions, the combination which comprises two separate relay coils for connection respectively in said load lines as conducting parts thereof, said coils having a contactor associated therewith in common and each said coil being operative to displace said contactor in response only to a flow of current through the coil at least as great as that which exists when every lamp of the lamp group to be energized through the coil is functioning, and a pilot circuit containing said contactor for energizing said pilot lamp upon each current-responsive displacement of said contactor, whereby said pilot lamp will appear to be illuminated steadily when all the signal lamps of the alternately flashed lamp groups are functional and will be illuminated periodically so as to indicate a lamp outage when any signal lamp of either lamp group does not function.

2. A circuit combination according to claim 1, said pilot circuit comprising two branches connected separately, respectively, with one and the other of said load lines and each leading to said contactor for energizing the pilot lamp, each of said braches containing between its connected load line and said contactor means for limiting current flow in the branch to flow in the direction toward the pilot lamp.

3. A circuit combination according to claim 2, each said current flow limiting means comprising a diode.

4. A circuit combination according to claim 1, said pilot circuit leading from a terminal for connecting it with said d.c. source in parallel with said flasher switch.

* * * * *